Patented Jan. 16, 1923.

1,442,752

UNITED STATES PATENT OFFICE.

HEINRICH H. WARMUND, OF BERLIN-CHARLOTTENBURG, GERMANY.

COMPOSITION FOR COATING, SEALING, AND THE LIKE.

No Drawing. Application filed November 18, 1922. Serial No. 601,878.

*To all whom it may concern:*

Be it known that I, HEINRICH H. WARMUND, citizen of the Republic of Poland, residing at Berlin-Charlottenburg, Germany, have invented certain new and useful Improvements in Compositions for Coating, Sealing, and the like, of which the following is a specification.

As substitutes for bottle lacquer, sealing wax and similar materials which must be applied in a heated state to articles under treatment, and which on cooling produce the desired coats, seals or the like, a great number of compositions have been proposed to be used in a cold state. However, all these compositions have some drawbacks and do not meet the requirements made of such compositions of matter. For instance, a composition for closing air tight or capsuling bottles needs to be adhesive and of such consistency that it will not drop off (when the bottle is dipped in) and afterwards not flow off, it must resist moisture and heat, it must be insoluble in the usual organic solvents such as alcohol, and finally it must not be dangerous to use.

This invention provides a composition of matter which meets all the the requirements mentioned above. The new composition is prepared by mixing an agglutinant, preferably good leather glue such as is used in gluing leather and like substances, with an aqueous solution of soap and wax, adding at the same time as fillers earthy substances, preferably talc.

To illustrate the invention, the following composition of a bottle-capsuling material may serve as example: About 10 parts by weight of commercial liquid leather glue which is diluted to say 28 to 35 degrees Baumé, are mixed with about 20 parts by weight of talc and about 3 parts by weight of an aqueous soap and wax solution which contains in 1 litre about 25 grams of hard soap and 40 to 50 grams of carnauba wax. If desired, any suitable colouring matter is added.

Instead of the commercial liquid glue as cited in the previous example, water-glass may be used as an agglutinant, preferably with the addition of a small percentage of zinc-white, the proportions of the other constituents being esentially the same as in the example given above.

The new compositions, of course, can be used for cold sealing and for similar purposes.

What I claim is:

1. A composition of matter for coating, sealing and like purposes, comprising a mixture of 3 parts by weight of an aqueous solution, said solution having 40 to 50 grams of carnauba wax and 25 grams of hard soap, per litre of water, 10 parts by weight of a liquid leather glue at 28 degrees to 35 degrees Baumé, and 20 parts by weight of talc.

2. A composition of matter for coating, sealing and like purposes, comprising a mixture of approximately 3 parts by weight of an aqueous solution, said solution having 40 to 50 grams of carnauba wax and 25 grams of hard soap, per litre of water; approximately 10 parts by weight of a liquid leather glue at 28 degrees to 35 degrees Baumé; and approximately 20 parts by weight of talc.

3. A composition of matter for coating, sealing, and like purposes, comprising approximately 3 parts of an aqueous solution of wax and soap in the proportion of 2 to 1; approximately 10 parts of an agglutinant; and approximately 20 parts of an earthy filling material.

4. A composition of matter for coating, sealing, and like purposes, comprising a mixture of approximately 3 parts of an aqueous solution of wax and soap in the proportion of 2 to 1; approximately 10 parts of an agglutinant; and a preponderance of an earthy filling material sufficient to make a coating composition of a viscous cohesive consistency when heated, and solid when cooled to ordinary temperatures.

5. A compostion of matter according to claim 4, the agglutinant being liquid leather glue.

In testimony whereof I have signed my name to this specification.

HEINRICH H. WARMUND.